(No Model.)
J. L. HALL.
REIN HOLDER.
No. 263,897. Patented Sept. 5, 1882.
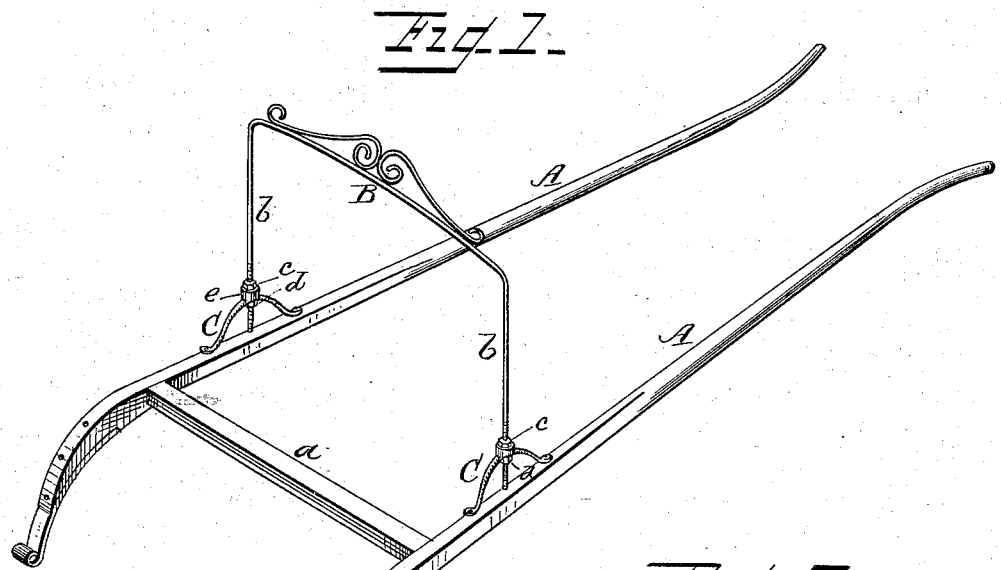
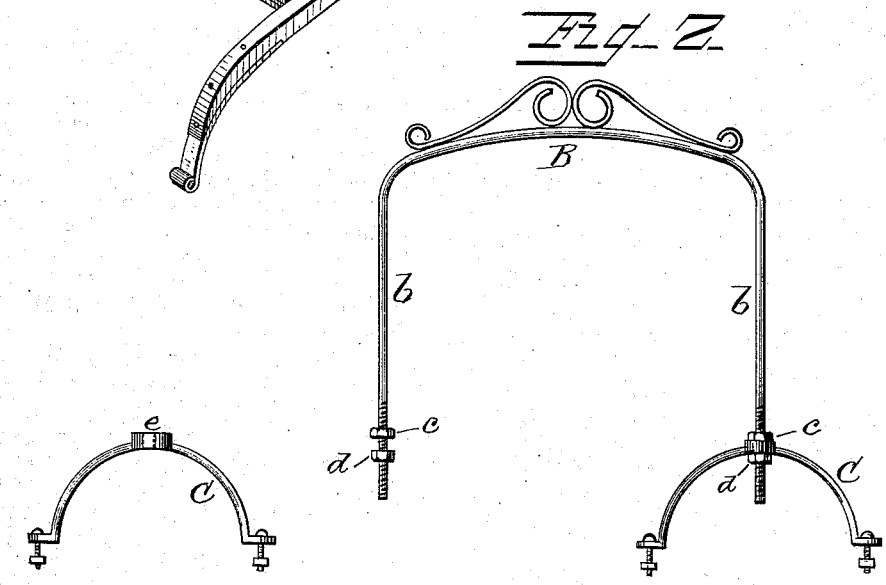
WITNESSES
Franck L. Ourand,
N. E. Oliphant,
INVENTOR
Jacob L. Hall,
per Chas. H. Fowler.
Attorney.

UNITED STATES PATENT OFFICE.

JACOB L. HALL, OF FALMOUTH, KENTUCKY.

REIN-HOLDER.

SPECIFICATION forming part of Letters Patent No. 263,897, dated September 5, 1882.

Application filed May 14, 1881. (No model.)

*To all whom it may concern:*

Be it known that I, JACOB L. HALL, a citizen of the United States, residing at Falmouth, in the county of Pendleton and State of Kentucky, have invented certain new and useful Improvements in Rein-Holders; and I do hereby declare the following to be a full, clear, and exact description of the same, reference being had to the annexed drawings, making part of this specification, and to the letters and figures of reference marked thereon.

Figure 1 of the drawings is a perspective view of my invention applied to the shafts of a vehicle, and Fig. 2 a side elevation of the same detached.

This invention relates to certain new and useful improvements in devices for supporting the driving-reins of a horse when attached to a vehicle, and which may be adjusted to suit the height of different horses, the objects thereof being to produce such a device as will be simple in its construction, that may be readily connected to or disconnected from the shafts of any vehicle, and adjusted to any required height above the horse to support the driving-reins and prevent them from being drawn under the tail of the animal; or, in case of the reins being dropped from the hands of the driver, they will be prevented from falling under the animal's feet, thus preventing the horse from becoming annoyed or frightened by the entanglement of the reins with its tail or feet, such entanglement frequently causing the horse to kick or run away from fright, and thereby do damage to the vehicle and injury to the occupant. These objects I attain by the construction substantially as shown in the accompanying drawings and hereinafter described.

In the accompanying drawings, A represents a pair of shafts of the ordinary construction, connected by a cross-bar, *a.*

The rein-holder B is provided with vertical arms *b*, screw-threaded at their lower ends to receive screw-threaded nuts *c d*, and pass down through eyes *e* in brackets C, said brackets being rigidly secured by any suitable means to the upper side of the shafts A in front of the cross-bar *a*, the reins being supported by the holder B, and the height of said holder regulated to suit the horse by means of the screw-nuts *c d*. When desired to remove the holder from the shafts the nuts *d* below the eye *e* in the brackets C are unscrewed and the vertical arms *b* lifted up out of the said brackets. The rein-holder is preferably made of iron, bronzed, plated, or otherwise ornamented to suit the vehicle to which it is applied, giving to the said vehicle an ornamental and finished appearance.

It will be readily seen from the above description that I have constructed a rein-holder capable of being readily connected to or disconnected from the shafts of a vehicle, which will support the driving-reins and prevent them from becoming entangled with the tail or feet of the horse, and at the same time as the holder comes directly over the hips or crupper of the animal it will prevent said animal from raising itself sufficiently to kick, should it become unruly or frightened, the device being easily regulated to suit the height of animal.

Having now fully described my invention, what I claim as new, and desire to secure by Letters Patent, is—

The combination, with the brackets C, having eyes *e*, and secured to the shafts A in front of the cross-bar *a*, of the rein-holder B, having screw-threaded vertical arms *b*, and the nuts *c d*, by means of which the height of said rein-holder may be regulated or removed entirely from the brackets, substantially as shown and described.

JACOB L. HALL.

Attest:
JAMES DAVID LOGAN,
JOHN B. APPLEGATE.